US007008998B2

(12) United States Patent
Tazzia et al.

(10) Patent No.: US 7,008,998 B2
(45) Date of Patent: Mar. 7, 2006

(54) METHOD FOR MAKING AN AQUEOUS DISPERSION

(75) Inventors: Charles L. Tazzia, Grosse Pointe Farms, MI (US); William H. Alford, Livonia, MI (US); Grant E. Cooley, Warren, MI (US)

(73) Assignee: BASF Corporation, Southfield, MI (US)

( * ) Notice: Subject to any disclaimer, the term of this patent is extended or adjusted under 35 U.S.C. 154(b) by 729 days.

(21) Appl. No.: 09/987,823

(22) Filed: Nov. 16, 2001

(65) Prior Publication Data

US 2003/0096906 A1 May 22, 2003

(51) Int. Cl.
*C08K 3/00* (2006.01)

(52) U.S. Cl. ............... 524/800; 524/804; 524/832; 524/839

(58) Field of Classification Search ............... 524/800, 524/804, 832, 839
See application file for complete search history.

(56) References Cited

U.S. PATENT DOCUMENTS

| | | | |
|---|---|---|---|
| 4,039,627 A | 8/1977 | Katsimbas | 260/836 |
| 4,442,244 A | 4/1984 | Johannes et al. | 523/221 |
| 4,772,329 A | 9/1988 | Lühmann et al. | 106/170 |
| 4,777,207 A | 10/1988 | Redman | 524/458 |
| 4,900,415 A | 2/1990 | Chung et al. | 204/181 |
| 5,550,284 A | 8/1996 | Sato et al. | 562/467 |
| 5,670,571 A | 9/1997 | Gabrielson et al. | 524/604 |
| 5,998,507 A | 12/1999 | Adachi et al. | 523/340 |
| 6,054,033 A | 4/2000 | Hunakoshi et al. | 204/501 |
| 6,147,144 A * | 11/2000 | Song et al. | 523/408 |
| 6,204,310 B1 * | 3/2001 | Choudhery | 523/348 |
| 6,235,812 B1 | 5/2001 | Reuter et al. | 523/412 |
| 6,627,725 B1 * | 9/2003 | Ardaud et al. | 528/45 |

FOREIGN PATENT DOCUMENTS

| | | |
|---|---|---|
| CA | 2175530 | 5/1996 |
| EP | 0 612 818 | 2/1994 |
| WO | WO87/02043 | 4/1987 |

OTHER PUBLICATIONS

Patent Abstract of Japan, vol. 1999, no 02, Feb. 26, 1999, JP 10 292131 A (Nippon Paint Co. LTD).
International Search Report for PCT/US 02/27037, International Filing Date Sep. 8, 2002 on 4 pages.
English Abstract for JP49-001631.
Machine Translation for JP 09-012974.
Machine Translation for JP06-212049.
Machine Translation for JP09-087554.
English Abstract for FR 02368527.

* cited by examiner

*Primary Examiner*—Edward J. Cain

(57) ABSTRACT

The invention relates to a method for preparing aqueous dispersions, especially electrodepositable aqueous dispersions. The invention requires the use of a polymer (a) comprising one or more water dispersible groups per molecule and one or more functional groups (f), and at least one crosslinking agent (b) comprising one or more blocked functional groups ($f_b$) reactive with polymer (a) after unblocking. Crosslinking agent (b) has a $T_g$ of from 40 to 70° C./105 to 158° F. and is a solid at 23.9° C./75° F. when at 100% by weight solids. Crosslinking agent (b) is mixed into polymer (a) at a temperature at or above the melting temperatures of both polymer (a) and compound (b) but below the temperature at which blocked functional groups ($f_b$) unblock. Sufficient water is added to the resulting melt-mixture (ii) to provide an aqueous dispersion.

62 Claims, No Drawings

US 7,008,998 B2

METHOD FOR MAKING AN AQUEOUS DISPERSION

FIELD OF THE INVENTION

The invention relates to the manufacture of thermosetting aqueous dispersions, especially to electrodepositable aqueous dispersions.

BACKGROUND OF THE INVENTION

Aqueous dispersions are used in a variety of applications in the automotive coatings industry. They advantageously provide reduced organic emissions, lower toxicity, and/or reduced fire hazards. The term "dispersion" may generally refer to a two phase system of a finely divided solid, liquid, or gas in a continuous medium. However, as used herein, "dispersion" particularly refers to two-phase systems of one or more finely divided solids, liquids or mixtures thereof, in a continuous liquid medium such as water or a mixture of water and various cosolvents. "Emulsion" as used herein refers to a dispersion of liquid droplets in a liquid medium, preferably water or a mixture of water and various cosolvents.

Aqueous dispersions may be used as electrodeposition coatings, primers, sealers, basecoats, and/or topcoats. Various binders may be used in aqueous dispersions, including but not limited to, epoxy based resins, acrylic resins, polyester resins, alkyds, polyurethanes, polyurethane adducts, and the like.

Electrodeposition coatings are used in a coating process in which electrically charged coating particles are 'plated' or 'deposited' out of a aqueous dispersion in order to coat a conductive part. Electrodeposition or "e-coat" processes are advantageous both economically and environmentally, due to the high transfer efficiency and low levels of organic solvent.

Curable electrodepositable coatings have traditionally been relied upon to provide an initial coating layer responsible for imparting optimum corrosion resistance to complex metal parts such as automotive bodies. The improved corrosion resistance often associated with electrodeposition is often attributed to several factors. First, electrodeposition processes result in the production of an even, continuous coating layer over all portions of the metal part, even those areas that would be inaccessible to traditional spray processes. Second, curable electrodeposition coatings have traditionally used aromatic moiety containing epoxy-based resins as well as one or more lead containing pigments.

Until recently, it has not been necessary for electrodeposition coatings to provide cured films having optimum performance properties with respect to appearance, weatherability and/or UV durability. However, the automotive industry's continuing desire for improvements in quality, efficiency and cost encourages the development of monocoat systems for metal parts, especially those made of steel. A commercially successful monocoat composition must (i) be capable of application via traditional electrodeposition processes, (ii) provide optimum corrosion resistance, (iii) provide optimum finished film properties with respect to appearance, weatherability, and UV durability, and (iv) low volatile organic content (VOC), especially with regard to the solvents traditionally used in the polymerization of individual thermosetting components.

In addition, the continuing drive for improvements in quality, cost, and efficiency mandates commensurate improvements in the manufacture of such optimum coating compositions.

Thus, the poor weatherability associated with aromatic containing epoxy based electrodeposition coatings has lead to an increased interest in the development of aqueous dispersions based on other polymers but which retain many of the advantages of traditional aqueous dispersions, especially those which are electrodepositable. Similarly, there is a desire to improve the manufacturing processes of aqueous dispersions, especially electrodepositable dispersions, without diminishing any of the advantages traditionally obtained.

For example, the manufacture of electrodepositable aqueous dispersions has traditionally required the removal of significant amounts of organic solvents, normally present as a result of the polymerization of the individual thermosetting components. Such polymerization solvents are normally not removed until after the formation of the desired dispersion or emulsion. As a result, traditional manufacturing processes require the removal or 'stripping' of significant volumes of polymerization solvent from the final aqueous dispersion.

Such stripping operations are disadvantageous for several reasons. First, they require the expenditure of costly energy to volatilize the organic solvents. Second, stripping operations render valuable manufacturing equipment unavailable for more profitable operations. Third, because they take many hours to make, products requiring the removal of organic solvent have significantly higher labor costs. Fourth, stripping operations result in large volumes of waste solvent that are not reusable due to contamination with water. The disposal of contaminated waste solvent is expensive and contributes to a higher cost for products requiring stripping. Finally, manufacturing processes requiring large stripping operations generally result in products having a lower % nonvolatile, leading to lower yields and higher shipping costs.

Unfortunately, higher raw material costs associated with certain polymers mandate that manufacturing costs be reduced as much as possible, especially with respect to polymers such as acrylics, epoxies, and polyurethanes. Accordingly, a commercially acceptable acrylic based aqueous dispersion, especially an electrodepositable aqueous dispersion, must be made by a manufacturing process which eliminates most, if not all, of the disadvantages associated with the removal of large volumes of organic solvent from finished aqueous dispersions.

It is thus an object of the invention to provide a process of making aqueous dispersions, especially electrodepositable aqueous dispersions, that reduces the disadvantages associated with prior art manufacturing processing requiring the removal of organic solvent from finished aqueous dispersions.

It is a further object of the invention to provide a process of making an electrodepositable acrylic based aqueous dispersion that substantially eliminates the disadvantages associated with prior art manufacturing processing requiring the removal of organic solvent from finished aqueous dispersions.

SUMMARY OF THE INVENTION

These and other objects are achieved with the disclosed method of making a aqueous electrodepositable dispersion.

In one embodiment, the disclosed method comprises providing a polymer (a) and at least one crosslinking agent (b). Polymer (a) must have one or more water dispersible groups, preferably one or more saltable groups or precursor saltable groups per molecule, and one or more functional groups (f) reactive with crosslinking agent (b). Crosslinking agent (b) must have one or more blocked functional groups ($f_b$) that are reactive with polymer (a) after unblocking. In addition, it is an aspect of the invention that crosslinking agent (b) have a $T_g$ of from 40 to 70° C./105 to 158° F. and be a solid at 23.9° C./75° F. when at 100% by weight solids.

The crosslinking agent (b) is mixed into polymer (a) at a temperature that is at or above the melting temperatures of both polymer (a) and compound (b) but which is below the temperature at which blocked functional groups ($f_b$) unblock, so as to provide a melt-mixture (ii). Sufficient water is then added to the melt-mixture (ii) to form the aqueous dispersion of the invention.

In a preferred embodiment, the water dispersible group of polymer (a) is a saltable group and at least one salting agent is added to the melt-mixture (ii) so as to form a plurality of salted sites on the polymer (a) to create a salted melt-mixture (iii). A sufficient amount of water is then added to the salted melt-mixture (iii) so as to provide an aqueous electrodepositable dispersion.

In another embodiment of the invention, the disclosed method requires providing a polymer (a) which is an acrylic polymer. In one preferred embodiment, providing an acrylic polymer (a) comprises polymerizing one or more ethylenically unsaturated monomers in one or more organic polymerization solvents, wherein at least one of the ethylenically unsaturated monomers contains a saltable group or precursor saltable group, so as to form a mixture (i) comprising said organic polymerization solvents and an acrylic polymer (a) comprising one or more saltable sites. At least a portion of said polymerization solvents are then removed from mixture (i) to provide a mixture (i) having a solids content of no less than 40% by weight solids, based on the weight of mixture (i).

At least one crosslinking agent (b) is then mixed into mixture (i) wherein crosslinking agent (b) has one or more blocked functional groups ($f_b$) that are reactive with acrylic polymer (a) after unblocking, and a $T_g$ of from 40 to 70° C./105 to 158° F. Crosslinking agent (b) must also be a solid at 23.9° C./75° F. when at 100% nonvolatile. Crosslinking agent (b) is mixed into mixture (i) at a temperature which is at or above the melting temperature of both acrylic polymer (a) and compound (b) but which is below the temperature at which blocked functional groups ($f_b$) unblock, so as to provide a melt-mixture (ii).

At least one salting agent is then added into the melt-mixture (ii) so as to form a plurality of salted sites on the acrylic (a) to create a salted melt-mixture (iii). A sufficient amount of water is then added to the salted melt-mixture (iii) so as to provide an acrylic based aqueous electrodepositable dispersion.

DETAILED DESCRIPTION OF THE INVENTION

The invention relates to methods of making thermosetting aqueous dispersions. Such thermosetting aqueous dispersions will comprise at least one binder (a) and at least one crosslinking agent (b). Suitable binders (a) will have at least one water dispersible functional group per molecule, preferably more than one such group per molecule. 'Water dispersible functional group' as used herein encompasses nonionic groups, saltable groups, and precursor saltable groups.

The binder (a) will have at least one group per molecule of polymer (a) selected from the group of at least one nonionic group, at least one saltable site, at least one precursor saltable site, and mixtures thereof, with saltable sites and precursor saltable sites being preferred and precursor saltable sites most preferred. 'Nonionic group' as used herein refers to a noncharged organic group that imparts water dispersibility to a molecule. 'Saltable site' as used herein refers to those functional groups which are sufficiently acidic or basic to respectively undergo reaction with a base or an acid to produce an ionic group or salt which will facilitate the formation of a stable aqueous dispersion. In a most preferred embodiment, the ionic groups of polymer (a) in the presence of a voltage and direct current will undergo de-salting to facilitate the formation of a insoluble polymer which will deposit on a substrate immersed in the aqueous dispersion. Such ionic groups may be cationic or anionic, with cationic being most preferred. A 'precursor saltable site' refers to a functional group that can be converted to a saltable site via reaction between with one or more conversion compounds.

Illustrative examples of suitable nonionic groups that may be used to impart water dispersibility to polymer (a) are polyalkylene oxides such as polyethylene oxide and polypropylene oxide, as well as derivatives thereof.

Examples of suitable basic saltable groups that can be used to make cationic salted groups are amine functional groups, quaternary ammonium groups, as well as phosphonium and sulfonium groups. Suitable amine functional groups are be primary, secondary, tertiary amino groups or mixtures thereof. Secondary amines and tertiary amines are most preferred, with tertiary amine groups especially preferred. Such groups may also be part of polyamines and/or alkanol amines, with alkanol amines being preferred.

Suitable cationic precursor saltable sites are those functional groups convertible to a basic saltable group such as epoxy groups, isocyanate groups, and carboxylic acid. For example, epoxy groups may be reacted with either primary or secondary amines to provide a basic saltable site which can subsequently be reacted with an acidic salting agent to provide cationic sites. Isocyanate groups and carboxylic acid groups can be reacted with diamines having at least one tertiary amine and either a primary amine or secondary amine. Tertiary alkanol amines may also be reacted with isocyanate groups to provide a saltable group. Preferred cationic precursor saltable sites are epoxy groups and isocyanate groups, with epoxy groups being most preferred.

An example of a suitable acidic saltable group, i.e., one which can be used to make anionic salted sites, are acidic groups such as COOH, —$SO_3H$ and/or $PO_3H_2$ groups, with —COOH groups being most preferred.

Suitable examples of anionic precursor saltable sites are those functional groups convertible to an acidic saltable site. Examples are epoxy groups and isocyanate groups. For example, both epoxy groups and isocyanate groups may be reacted with polyfunctional compounds having at least one carboxylic acid group and either a primary or secondary amine.

The saltable sites or precursor saltable sites may be incorporated into polymer (a) according to conventional means, i.e., during the polymerization process or via a grafting process. If incorporation occurs during the polymerization of polymer (a) the saltable sites or precursor saltable sites will be on one or more of the reactants discussed below. For example, if polymer (a) is an acrylic polymer, the saltable site or precursor saltable site may be a functional group on an ethylenically unsaturated monomer.

If a precursor saltable site is used, one or more compounds as described above to convert the precursor site into a saltable site may be added after the polymerization of acrylic polymer (a).

The binder (a) will be at least one oligomer or polymer selected from the group of epoxy and epoxy based resins, acrylic resins, polyester resins, alkyds, polyurethanes, polyurethane adducts, the like, and mixtures thereof. Polyurethane polymers, polyurethane adducts, epoxy and epoxy based resins, and acrylic polymers are most preferred, with acrylic polymers being most preferred.

An preferred example of suitable epoxy-based polymers having one or more saltable sites are those amine-modified epoxy resins which are the reaction products of polyepoxides, and amines selected from the group consisting of primary amines, secondary amines, tertiary amines, salts thereof, and mixtures thereof. Optionally, polyfunctional alcohols, polycarboxylic acids, polyamines, and/or polysulfides may also be used in admixture with the polyexpoxides and amines.

Suitable polyepoxides are those containing at least two epoxide groups per molecule to serve as the precursor saltable sites. Preferred are those compounds that contain two epoxy groups in the molecule and have a number average molecular weight of at least 750, preferably from 1400 to 1500. Most preferred epoxy compounds are polyglycidyl ethers of polyphenols prepared from polyphenols and epihalohydrins. Preferred polyphenols are bisphenol A and bisphenol F and 1,1-bis(4-hydroxyphenyl)-n-heptane. Also suitable are phenolic novolak resins.

Preferred epoxy compounds also include polyglycidyl ethers of polyhydric alcohols, such as ethylene glycol, diethylene glycol, bis-(4-hydroxycyclohexyl)-2,2-propane, and the like. It is also possible to use polyglycidyl esters of polycarboxylic acids, such as glycidyl adipate and glycidyl phthalate. Finally, it is also possible to use hydantoin epoxides, epoxidized butadiene and polyepoxy compounds which are obtained by epoxidizing an olefinically unsaturated alicylic compound.

Suitable amines to convert the epoxy groups to saltable sites are amines selected from the group consisting of primary amines, secondary amines, tertiary amines, salts thereof, and mixtures thereof. Secondary amines and the salts thereof are most preferred.

Preferably, the amine is a water soluble compound. Suitable examples include but are not limited to mono- and dialkylamines, such as methylamine, ethylamine, dimethylamine, methylbutylamine and the like. Likewise suitable are alkanolamines such as methylethanolamine, diethanolamine and the like. It is also possible to use dialkylaminoalkylamines such as dimethylaminoethylamine, diethylaminopropylamine, dimethylaminopropylamine and the like. In most cases, low molecular weight amines are most preferred.

Polyamines having primary and secondary amino groups can be reacted with the epoxy groups in the form of their ketamines. The ketimines are prepared from the polyamines in a known manner. The amines can also contain other groups, but these groups should not interfere with the reaction of the amine with the epoxy group, nor cause the reaction mixture to gel. Examples of such amines are hydroxylamine and the like. Most preferred amines are tertiary amines, such as dimethylethanolamine, triethylamine, trimethylamine, triisopropylamine and the like.

Optionally, the polyepoxides and amines may be reacted with polyfunctional alcohols, polycarboxylic acids, polyamines, and/or polysulfides.

Suitable polyols include diols, triols and higher polymeric polyols, such as polyester polyols, polyether polyols and the like. Polyalkylene ether polyols suitable for use are those of the formula:

wherein R is H or a lower alkyl radical, with or without various substituents, n is 2 to 6, and m is 3 to 50 or higher. Examples are poly(oxytetramethylene) glycols and poly(oxyethylene) glycols. The preferred polyalkylene ether polyols are poly(oxytetramethylene) glycols having a number average molecular weight of 350 to 1000.

Polyester polyols may also be used to react with the polyepoxides and amines. Suitable examples are those prepared by polyesterification of organic polycarbonate acids or anydrides thereof with organic polyols that contain primary hydroxyl groups. Aliphatic or aromatic dicarboxylic acids and diols are preferred as the polycarboxylic acids and polyols. Diols used include alkylene glycols such as ethylene glycol and the like and glycols such as cyclohexanedimethanol. The acid component may be carboxylic acids or anhydrides having from 2 to 18 carbons in the molecule. Examples are phthalic acid, isophthalic acid, tetrahydrophthalic acid, adipic acid, azelaic acid, sebacic acid, maleic acid, glutaric acid and the like, as well as the anhydrides thereof.

Also suitable for reaction with the polyepoxides and amines are polyester polyols that are derived from lactones. These polyols are obtained via reaction of an ε-caprolactone with a polyol. Materials of this type are described in U.S. Pat. No. 3,169,945. Most preferably, such compounds will have a terminal hydroxyl group and recurring polyester segments derived from the lactone.

Also suitable for reaction with the polyepoxides and amines are aliphatic and/or alicylic polyfunctional alcohols or carboxylic acids having a molecular weight of below 350. Preferably, such compounds will have a branched aliphatic chain, most preferably a chain having at least one neo structure. Examples include diols such as ethylene glycol, diglycol, dipropylene glycol, dibutylene glycol, triglycol, 1,2-propane diol, 2,2-dimethyl,1,3-propanediol, 2-methyl-2-ethyl-1,3-propanediol, 1,2-butanediol, 2-ethyl-1,4-butanediol, 2,2-diethyl-1,3-butanediol, butene-2-diol-1,4, 1,2-pentanediol, 3-methyl-1,5-pentanediol 1,6-hexanediol, 2-ethyl-1,3-hexanediol, 2,5-dimethyl-2,5-hexanediol, 1,3-octanediol, 4,5-nonanediol, 2,10-decanediol, 2-hydroxyethyl hydroxyacetate, 2,2-dimethyl-3-hydroxypropyl2,2-dimethylhydroxypropionate, 2-methyl-2-propyl-3-hydroxypropyl 2-methyl-2-propylhydroxypropionate, 4,4'-methylenebiscyclohexanol, and 4,4'-isopropylidenebiscyclohexanol. Most preferred diols are 2,2-dimethyl-1,3-propanediol, 3-methyl-1,5-pentanediol, 2,2-dimethyl-3-hydroxypropyl 2,2-diemethylhydroxylpropionate and 4,4'-isopropylidenebiscyclohexanol.

Illustrative carboxylic acids are those such as oxalic acid, malonic acid, 2,2-dimethylmalonic acid, succinic acid, glutaric acid, adipic acid, hexahydroxphthalic acid, maleic acid, fumaric acid, pimelic acid, suberic acid, azelaic acid, sebacic acid, itaconic acid, citraconic acid, mesaconic acid, and glutaconic acid.

Also suitable for reaction with the polyepoxides and amines are dicarboxylic acids such as 2,2-dimethylmalonic acid, hexahydrophthalic acid, and dimeric fatty acids such as dimeric linoleic acid.

Suitable polyamines for use in the reaction between the polyepoxides and amines are those prepared by reaction of primary diamines and monoepoxides.

Finally, other compounds which may be used in the reaction between the polyepoxides and amines are polyfunctional SH compounds, polyphenols, and polyurethanes.

Polyurethanes having active hydrogen functional groups suitable for use as polyfunctional polymeric compound (c) are well known in the art. They are prepared by a chain extension reaction of a polyisocyanate (e.g., hexamethylene diisocyanate, isophorone diisocyanate, MDI, etc.) and a polyol (e.g., 1,6-hexanediol, 1,4-butanediol, neopentyl glycol, trimethylol propane). They can be provided with active hydrogen functional groups by capping the polyurethane chain with an excess of diol, polyamine, amino alcohol, or the like.

A particularly preferred polyurethane polymer (a) has a glass transition temperature of about 0° C. or less, preferably about −20° C. or less, and more preferably about −30° C. or less. The glass transition temperature of the polyurethane is in the range of from about −80° C. to about 0° C., more preferably from about −65° C. to about −10° C., still more preferably from about −65° C. to about −30° C., and even still more preferably from about −60° C. to about −35° C.

The weight average molecular weight of the polyurethane preferred for use as polymer (a) is preferably from about 15,000 to about 60,000, more preferably from about 15,000 to about 60,000, and even more preferably from about 20,000 to about 35,000.

Polyurethanes are prepared by reaction of at least one polyisocyanate and at least one polyol. The reactants used to prepare the polyurethane are selected and apportioned to provide the desired glass transition temperature. Suitable polyisocyanates include, without limitation, aliphatic linear and cyclic polyisocyanates, preferably having up to 18 carbon atoms, and substituted and unsubstituted aromatic polyisocyanates. Illustrative examples include, without limitation, ethylene diisocyanate, 1,2-diisocyanatopropane, 1,3-diisocyanatopropane, 1,4-butylene diisocyanate, lysine diisocyanate, 1,4-methylene bis(cyclohexyl isocyanate), isophorone diisocyanate, toluene diisocyanates (e.g., 2,4-toluene diisocyanate and 2,6-toluene diisocyanate) diphenylmethane 4,4'-diisocyanate, methylenebis-4,4'-isocyanatocyclohexane, 1,6-hexamethylene diisocyanate, p-phenylene diisocyanate, tetramethyl xylene diisocyanate, meta-xylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, and combinations of two or more of these. Biurets, allophonates, isocyanurates, carbodiimides, and other such modifications of these isocyanates can also be used as the polyisocyanates. In a preferred embodiment, the polyisocyanates include methylenebis-4,4'-isocyanatocyclohexane, 1,6-hexamethylene diisocyanate, 1,12-dodecamethylene diisocyanate, and combinations thereof. It is particularly preferred to use at least one α,ω-alkylene diisocyanate having four or more carbons, preferably 6 or more carbons, in the alkylene group. Combinations of two or more polyisocyanates in which one of the polyisocyanates is 1,6-hexamethylene diisocyanate are especially preferred.

The polyol or polyols used to prepare a polyurethane polymer (a) can be selected from any of the polyols known to be useful in preparing polyurethanes, including, without limitation, 1,4-butanediol, 1,3-butanediol, 2,3-butanediol, 1,6-hexanediol, neopentyl glycol, 1,3-propanediol, 1,5-pentanediol, 1,6-hexanediol, 1,9-nonanediol, ethylene glycol, diethylene glycol, triethylene glycol and tetraethylene glycol, propylene glycol, dipropylene glycol, glycerol, cyclohexanedimethanols, 2-methyl-2-ethyl-1,3-propanediol, 2-ethyl-1,3-hexanediol, thiodiglycol, 2,2,4-trimethyl-1,3-pentanediol, cyclohexanediols, trimethylolpropane, trimethylolethane, and glycerin; polyester polyols such as the reaction products of any of the foregoing alcohols and combinations thereof with one or more polycarboxylic acids selected from malonic acid, maleic acid, succinic acid, glutaric acid adipic acid, azelaic acid, anhydrides thereof, and combinations thereof; polyether polyols, such as polyethylene glycols and polypropylene glycols; and combinations of such polyols. Polyols having two hydroxyl groups are preferred. The polyurethane is preferably prepared using one or more polyester polyols. In a preferred embodiment, the polyester polyol is the reaction product of a mixture that comprises neopentyl glycol and adipic acid.

Suitable polyesters can be prepared by the esterification of a polycarboxylic acid or an anhydride thereof with a polyol and/or an epoxide. The polycarboxylic acids used to prepare the polyester consist primarily of monomeric polycarboxylic acids or anhydrides thereof having 2 to 18 carbon atoms per molecule. Among the acids that are useful are phthalic acid, hexahydrophthalic acid, adipic acid, sebacic acid, maleic acid, and other dicarboxylic acids of various types. Minor amounts of monobasic acids can be included in the reaction mixture, for example, benzoic acid, stearic acid, acetic acid, and oleic acid. Also, higher carboxylic acids can be used, for example, trimellitic acid and tricarballylic acid. Anhydrides of the acids referred to above, where they exist, can be used in place of the acid. Also, lower alkyl esters of the acids can be used, for example, dimethyl glutarate and dimethyl terephthalate.

Polyols that can be used to prepare the polyester include diols such as alkylene glycols. Specific examples include ethylene glycol, 1,6-hexanediol, neopentyl glycol, and 2,2-dimethyl-3-hydroxypropyl-2,2-dimethyl-3-hydroxypropionate. Other suitable glycols include hydrogenated Bisphenol A, cyclohexanediol, cyclohexanedimethanol, caprolactone-based diols such as the reaction product of e-caprolactone and ethylene glycol, hydroxy-alkylated bisphenols, polyether glycols such as poly(oxytetramethylene)glycol, and the like.

Although the polyol component can comprise all diols, polyols of higher functionality can also be used. It is preferred that the polyol be a mixture of at least one diol; and at least one triol, or one polyol of higher functionality. Examples of polyols of higher functionality would include trimethylol ethane, trimethylol propane, pentaerythritol, and the like. Triols are preferred. The mole ratio of polyols of higher functionality to diol is less than 3.3/1, preferably up to 1.4/1.

In a most preferred embodiment, the aqueous dispersion of the invention will be an acrylic-based aqueous dispersion. As used herein 'acrylic based' refers to film forming compositions having a binder and a crosslinking agent wherein at least 30% nonvolatile of the binder is from an acrylic polymer. In a most preferred embodiment of the invention, the thermosetting acrylic-based aqueous dispersion will be electrodepositable.

A most preferred embodiment of the process of the invention requires the use of at least one acrylic polymer (a). The term 'acrylic polymer' as used herein is intended to refer to oligomers, polymers and/or copolymers that result from the polymerization of one or more ethylenically unsaturated monomers.

Suitable acrylic polymers (a) will generally have a number average molecular weight of from 1000 to 100,000, with molecular weights of from 3000 to 25,000 being preferred and values of from 7000 to 10,000 being most preferred. Number average molecular weight may be calculated using a GPC using a polystyrene standard.

Suitable acrylic polymers (a) will have at least one saltable site per molecule or at least one precursor saltable site per molecule. In a most preferred embodiment, one or more ethylenically unsaturated monomers will be selected so as to provide the at least one saltable site or precursor saltable site per molecule of acrylic polymer (a).

In a preferred embodiment, acrylic polymer (a) will have from 0.2 to 3.0 mEQ of saltable sites or precursor saltable sites/g NV of acrylic polymer (a), preferably from 0.4 to 2.0 mEQ/g NV, and most preferably from 0.6 to 0.9 mEQ of saltable sites or precursor saltable site/g NV of acrylic polymer (a).

In addition to the one or more saltable sites per molecule, the acrylic polymer (a) will be hydroxyl functional. The required hydroxyl functionality may come from (i) the polymerization of hydroxyl functional ethylenically unsaturated monomers, (i) the at least one salting agent, (iii) reactions converting a precursor saltable site to a saltable site, i.e., the ring opening of an oxirane group, and (iv) combinations thereof. In a most preferred embodiment, the required hydroxyl value will result from combination of all such factors. In general, salted acrylic polymer (a) will have a total hydroxyl concentration of from 0.5 to 8.0 mEQ per gram NV of acrylic polymer (a), preferably from 1.5 to 6.0 mEQ/g NV, and most preferably from 2.5 to 4.5 mEQ per gram NV of acrylic polymer (a).

It will be appreciated that one or more, preferably two or more, and most preferably a mixture of three or more different ethylenically unsaturated monomers will be selected such that acrylic polymer (a) having the above noted parameters is obtained upon polymerization of said monomers.

Illustrative ethylenically unsaturated monomers that may be used in forming a polymer (a) include esters or nitriles or amides of ethylenically unsaturated monocarboxylic acids containing 3 to 5 carbon atoms; esters of ethylenically unsaturated dicarboxylic acids containing 4 to 6 carbon atoms; vinyl esters, vinyl ethers, vinyl ketones, vinyl amides, and vinyl compounds of aromatics and heterocycles. Representative examples include acrylic and methacrylic acid amides and aminoalkyl amides; acrylonitrile and methacrylonitriles; esters of acrylic and methacrylic acid, particularly those with saturated aliphatic and cycloaliphatic alcohols containing 1 to 20 carbon atoms such as methyl, ethyl, propyl, butyl, 2-ethylhexyl, isobutyl, isopropyl, cyclohexyl, tetrahydrofurfuryl, and isobornyl acrylates and methacrylates, as well as hydroxy and amine hydroxyalkyl acrylates and methacrylates such as hydroxyethyl, hyroxypropyl, and hydroxybutyl acrylates and methacrylates, and aminoalkyl esters of methacrylic or acrylic acid like N,N-dimethylaminoethyl (meth)acrylate and t-butylamino ethyl (meth)acrylate; esters of fumaric, maleic, and itaconic acids, like maleic acid dimethyl ester and maleic acid monohexyl ester; vinyl acetate, vinyl propionate, vinyl ethyl ether, and vinyl ethyl ketone; styrene, α-methyl styrene, vinyl toluene, and 2-vinyl pyrrolidone.

Ethylenically unsaturated isocyanate functional monomers may also be used and include meta-isopropenyl-α,α, α-dimethylbenzyl isocyanate (sold by American Cyanamid as TMI®) and isocyanatoethyl methacrylate.

Examples of preferred ethylenically unsaturated monomers are ethylenically unsaturated monomers having epoxide functionality, hydroxyalkyl esters of acrylic acid or methacrylic acid, esters of acrylic acid or methacrylic acid, aromatic vinyl monomers, and mixtures thereof, with mixtures thereof being most preferred.

Examples of suitable epoxy functional ethylenically unsaturated monomers include those monomers having from 6 to 12 carbon atoms such as glycidyl acrylate, glycidyl methacrylate, allyl glycidyl ether, methallyl glycidyl ether, glycidyl crotonate, vinyl glycidyl ether, allyl glycidyl maleate, allyl glycidyl phthalate and butadiene monoxide. Preferred ethylenically unsaturated epoxy functional monomers are glycidyl acrylate and glycidyl methacrylate Illustrative hydroxylalkyl esters of methacrylic acid or acrylic acid include hydroxyethyl acrylate, hydroxyethyl methacrylate, hydroxy propyl acrylate and hydroxybutyl acrylate, with hydroxyethyl methacrylate and hydroxyethyl acrylate being preferred.

Examples of suitable acrylic acid esters or methacrylic acid esters of aliphatic saturated monoalcohols with 1 to 8 carbon atoms include methyl methacrylate, ethyl acrylate, butyl acrylate, 2-ethylhexyl acrylate, 2-ethylhexyl methacrylate, isobutyl acrylate and butyl methacrylate. Methyl methacrylate, n-butyl acrylate or n-butyl methacrylate are preferred.

Illustrative examples of aromatic vinyl monomers are styrene and vinyl toluene, with styrene being especially preferred.

Polymer (a) may be made according to bulk polymerization, solution polymerization and emulsion polymerization with solution polymerization methods being most preferred, especially with respect to most preferred acrylic polymer (a).

Polymer (a) may be provided as a solid resin, a liquid resin, a resin solution, or as a mixture (i) of a polymer (a) and one or more polymerization solvents. Suitable polymerization solvents are organic solvents that lack functional groups that could participate in polymerization or side reactions. Illustrative examples include methylene chloride, acetone, methyl ethyl ketone, methyl isobutyl ketone, benzene, xylene, toluene, the like, and mixtures thereof.

The mixture (i) will have a solids content (% NV) of at least 40% by weight, based on the total weight of mixture (i). Preferably, mixture (i) will have a solids content (% NV) of no less than 60% by weight, and more preferably no less than 70% by weight, based on the total weight of mixture (i). Most preferably, mixture (i) will have a % nonvolatile approaching as close to 100% percent as possible. In a particularly preferred embodiment, mixture (i) will have a % nonvolatile of at least 85% by weight, more preferably at least 95% by weight, and most preferably at least 99% by weight or greater, based on the total weight of mixture (i).

In a most preferred embodiment of the invention, the mixture (i) will result from the polymerization of a mixture of one or more ethylenically unsaturated monomers in one or more polymerization solvents. While mixture (i) having an initial solids content may be used without modification throughout the method of the invention, it is also within the scope of the invention to modify the solids content of mixture (i) as part of the method of the invention.

For example, it is within the scope of the invention to begin the process of the invention with a mixture (i) having a % percent nonvolatile of at least 40% and to remove some or all of the polymerization solvents to achieve a mixture (i) having a % nonvolatile of 80% or more. Such excess polymerization solvents may be removed before the addition of the crosslinking agent (b) or from the final aqueous dispersion. Solvent removal may be done according to known manufacturing processes such as vacuum distillation. However, it is preferred that a majority of the polymerization solvents associated with polymer (a) be removed prior to the addition of crosslinking agent (b) so that the % nonvolatile of mixture (i) is as high as possible, preferably between 80 to 100% nonvolatile, before the addition of crosslinking agent (b).

Polymer (a) will generally be present an amount of from 5 to 95% by weight nonvolatile, based on the total nonvolatile weight of the aqueous dispersion. In a preferred embodiment, polymer (a) will be present in an amount of from 20 to 85% by weight nonvolatile and more preferably from 50 to 75% by weight nonvolatile, based on the total nonvolatile weight of the aqueous dispersion.

The method of the invention further requires the use of a crosslinking agent (b). It is an aspect of the invention that crosslinking agent (b) be a solid at room temperature, that is, at 23.9° C./75° F. 'Solid' as used herein is defined as a substance that is relatively solid and compact, neither gaseous nor liquid.

Crosslinking agent (b) will also have a $T_g$ of from 35 to 90° C./95 to 195° F., more preferably from 40 to 80° C./105 to 175° F., and most preferably from 40 to 60° C./105 to 140° F. The number average molecular weight of crosslinking agent (b) should be generally be between 100 and 5000, preferably between 150 and 3000, and most preferably between 200 and 2000.

In addition, crosslinking agent (b) will have one or more blocked functional groups ($f_b$) which after unblocking are reactive with the functional groups of polymer (a), most preferably with the hydroxyl groups of acrylic polymer (a). Illustrative examples of suitable functional groups are isocyanate groups and carboxylic acid groups. In a most preferred embodiment of the invention, the functional groups of the crosslinking agent (b) will be isocyanate groups. Most preferably, crosslinking agent (b) will have at least 2 isocyanate groups per molecule, more preferably between 2 to 4 groups per molecule.

Particularly suitable for use as crosslinking agent (b) are blocked isocyanate functional polyurethane adducts. Diisocyanates and polyisocyanates will preferably be reacted with one or more suitable polyols in a stoichometric ratio such that an adduct having at least two isocyanate groups is produced. Illustrative polyols include diols, triols and higher polymeric polyols, such as polyester polyols, polyether polyols and the like, with the higher polymeric polyols being preferred, and polyester polyols being most preferred.

Suitable polyisocyanates (ai) are monomeric polyisocyanates that can be aliphatic, cycloaliphatic, and/or aromatic polyisocyanates. Useful aliphatic polyisocyanates include aliphatic diisocyanates such as ethylene diisocyanate, 1,2-diisocyanatopropane, 1,3-diisocyanatopropane, 1,6-diisocyanatohexane, 1,4-butylene diisocyanate, lysine diisocyanate, 1,4-methylene bis-(cyclohexyl isocyanate) and isophorone diisocyanate. Useful aromatic diisocyanates and araliphatic diisocyanates include the various isomers of toluene diisocyanate, meta-xylylenediisocyanate and para-xylylenediisocyanate, also 4-chloro-1,3-phenylene diisocyanate, 1,5-tetrahydro-naphthalene diisocyanate, 4,4'-dibenzyl diisocyanate and 1,2,4-benzene triisocyanate can be used. In addition, the various isomers of α,α,α,-tetramethyl xylene diisocyanate can be used. Biurets, allophanates, and uretadiones of isocyanates such as DESMODUR® N1OO from Bayer may also be useful. Aliphatic diisocyanates and polyisocyanates are preferred. Preferably, the polyisocyanate will be a diisocyanate. Isophorone diisocyanate is most preferred.

Polyalkylene ether polyols suitable for use are those of the formula:

wherein R is H or a lower alkyl radical, with or without various substituents, n is 2 to 6, and m is 3 to 50 or higher. Examples are poly(oxytetramethylene) glycols and poly (oxyethylene) glycols. The preferred polyalkylene ether polyols are poly(oxytetramethylene) glycols having a number average molecular weight of 350 to 1000.

Polyester polyols may also be used and are most preferred for use in making crosslinking agent (b). Suitable examples are those prepared by polyesterification of organic polycarbonate acids or anhydrides thereof with organic polyols that contain primary hydroxyl groups. Aliphatic or aromatic dicarboxylic acids and diols are preferred as the polycarboxylic acids and polyols, with aliphatic diacids and diols being most preferred. Diols used include alkylene glycols such as ethylene glycol and the like and glycols such as cyclohexanedimethanol. The acid component may be carboxylic acids or anhydrides having from 2 to 18 carbons in the molecule. Examples are phthalic acid, isophthalic acid, tetrahydrophthalic acid, adipic acid, azelaic acid, sebacic acid, maleic acid, glutaric acid and the like, as well as the anhydrides thereof.

Also suitable for reaction with disocyanates and polyisocyanates are polyester polyols which are derived from lactones. These polyols are obtained via reaction of an ε-caprolactone with a polyol. Materials of this type are described in U.S. Pat No. 3,169,945. Such compounds will preferably have a terminal hydroxyl group and recurring polyester segments derived from the lactone.

Illustrative blocking agents suitable for use in making blocked functional group ($f_b$) of crosslinking agent (b) are those known in the art such as alcohols, oximes and lactams, with lactams such as e-caprolactam being especially preferred. In a most preferred embodiment of the invention, the crosslinking agent will have a free isocyanate content of greater than 0 but less than 1.0% by weight, more preferably from 0.01 to 0.9%, and most preferably from 0.1 to 0.5% by weight, based on the total number of isocyanate groups of crosslinking agent (b). While not wishing to be bound to any particular theory, it has been hypothesized that reaction between the free isocyanate groups of crosslinking agent (b) and the hydroxyl groups of polymer (a) contributes to the surprising stability of the aqueous dispersion.

It will be appreciated that the blocking agent will be selected so as to unblock and facilitate cure at a desired temperature. Functional groups ($f_b$) should unblock at a temperature of from 140 to 230° C./285 to 445° F., more preferably from 150 to 200° C./302 to 395° F., and most preferably from 160 to 190 ° C./320 to 375° F. However, it is an aspect of the invention that the blocking agent is also selected so as to unblock at a temperature that is above the melting temperature of polymer (a) and crosslinking agent (b), preferably at least 40 degrees C./100 degrees F. above the melting temperature, and most preferably at least 70 or more degrees C./160 degrees F. above the melting temperature of polymer (a) and crosslinking agent (b).

A particularly preferred crosslinking agent (b) is Vestagon® 1065, commercially available from Huls America of Somerset, N.J.

Crosslinking agent (b) will generally be present an amount of from 5 to 90% by weight nonvolatile, based on the total nonvolatile weight of the aqueous dispersion. In a preferred embodiment, crosslinking (b) will be present in an amount of from 15 to 60% by weight nonvolatile and more preferably from 25 to 40% by weight nonvolatile, based on the total nonvolatile weight of the aqueous dispersion.

The process of the invention requires that crosslinking agent (b) be mixed into polymer (a) or the mixture (i) comprising polymer (a) at an elevated temperature so as to produce a melt-mixture (ii). The mixing of crosslinking agent (b) into polymer (a) must occur at a temperature that is at or above the melting temperature of polymer (a). More preferably, the mixing of crosslinking agent (b) into polymer (a) will occur at a temperature that is above the melting temperature of both polymer (a) and crosslinking agent (b). In a most preferred embodiment of the invention, the mixing of crosslinking agent (b) into polymer (a) will occur at a temperature of from 50 to 140° C./123 to 285° F., preferably from 60 to less than 140° C./140 to less than 285° F., and most particularly at a temperature of from 80 to 110° C./175 to 230° F.

The melt-mixing of polymer (a) and crosslinking agent (b) may be done using standard manufacturing equipment and should continue until uniform mixture is obtained.

If the melt-mixture (ii) contains a polymer (a) having one or more precursor saltable sites, such precursor sites must be converted to a saltable site prior to the addition of any salting or neutralizing agent. It will be appreciated that such conversion of the precursor saltable sites may occur at any time after the polymerization of polymer (a) and prior to the addition of the salting agent. In a most preferred embodiment, the conversion of the precursor saltable site will occur before the formation of the melt-mixture (ii). Suitable conversion compounds may be added as discussed above.

After melt-mixing, at least one salting or neutralizing agent is added to the melt-mixture (ii) so as to create a salted melt-mixture (iii) having a polymer (a) with one or more salted sites. It will be appreciated that selection of the salting agent will depend upon the character of the saltable site. If the saltable site is an anionic saltable group, the salting agent will be a basic compound. Illustrative examples of suitable basic salting agents are amines, alkanolamines and the like. Alkanolamines are especially preferred. If the saltable site is a cationic saltable group, the salting agent will be an acidic compound. Suitable acids are carboxylic acids such as lactic acid and acetic acid.

The amount of salting or neutralization agent added to the melt-mixture (ii) to create a salted melt-mixture (iii) will be sufficient to neutralize from 5 to 100% of the available saltable sites of polymer (a), based on the total number of available saltable sites. More preferably, sufficient salting agent will be added to neutralize from 40 to 80% of the available saltable sites, and most preferably from 55 to 65% of the available saltable sites of polymer (a), based on the total number of available saltable sites of polymer (a).

After the addition of the at least one saltable agent, water, preferably distilled water, will be added to the salted melt-mixture (iii). In general, sufficient water is added so that the final aqueous dispersion has a solids content of more than 20, preferably more than 30% by weight. The aqueous dispersions of the invention will generally have from 40–80% by weight of water, preferably from 45–70%, and most preferably from 55–65% by weight of water, based on the total weight of the aqueous dispersion.

In a particularly preferred embodiment, crosslinking agent (b) will be primarily dispersed into the aqueous dispersion by the action of polymer (a), although it is within the scope of the invention to add additive quantities of surfactants to address pigment interactions and appearance characteristics.

The final aqueous dispersion of the invention will have an average particle size of from 0.05 to 1.50 microns, preferably 0.05 to 0.75, and most preferably from 0.10 to 0.30. When the aqueous dispersion is electrodepositable, the average particle size will be from 0.05 to 0.50 microns, more preferably from 0.10 to 0.40 microns, and most preferably from 0.10 to 0.20 microns. In a most preferred embodiment, the particles will be micelles.

If the polymerization solvents of mixture (i) were not previously removed, any such polymerization solvents will most preferably be removed via known manufacturing techniques to provide an aqueous dispersion having less than 5.0% by weight of polymerization solvents, based on the total weight of the aqueous dispersion, preferably less than 2.0% by weight, more preferably less than 1.0% by weight, and most preferably less than 0.5% by weight, based on the total weight of the aqueous dispersion.

The aqueous dispersion of the invention may and most preferably will contain one or more catalyst (c) to facilitate the reaction between polymer (a) and crosslinking agent (b). Catalysts useful in the composition of the invention include Lewis acids, zinc salts, and tin salts. Illustrative Lewis acids or zinc salts are zinc nitrate, zinc acetate, bismuth octoate, dibutyltin dilaurate, dibutyltin oxide, and the like, with tin compounds being most preferred. Such catalysts will typically be used in an amount of from 0.01 to 3.0 weight percent, based on the resin solids, preferably from 0.01 to 1.0 weight percent, based on the resin solids.

Besides water, the aqueous dispersion may also contain one or more coalescing solvents. Coalescing solvents as used herein does not include polymerization solvents as discussed above. Useful coalescing solvents include hydrocarbons, alcohols, esters, glycol ethers, and ketones. The preferred coalescing solvents include glycol ethers, alcohols, and polyols, with glycol ethers being most preferred. Illustrative suitable coalescing solvents include monobutyl and monohexyl ethers of ethylene glycol, and propylene glycol phenyl ether, propylene glycol propyl ether, ethylene glycol butyl ether, ethyleneglycol dimethyl ether, dipropylene glycol methyl ether, or mixtures thereof. The amount of coalescing solvent is generally between about 0 to 15 percent by weight, preferably about 0.1 to 5 percent by weight based on total weight of the resin solids.

The aqueous dispersions can also contain optional ingredients such as wetting agents, dispersing agents, surfactants, defoamers, antioxidants, UV absorbers, light stabilizers, and so forth. Examples of surfactants and wetting agents include polymeric surfactants, alkyl imidazolines such as those available from Ciba-Geigy Industrial Chemicals as Amine C®, acetylenic alcohols available from Air Products and Chemicals as Surfynol® 104 with polymeric surfactants and dispersing agents being most preferred, especially polyoxylated diamines and copolyers having functional groups with pigment affinity. These optional ingredients, when present, constitute from about 0 to 20 percent by weight of resin solids, and preferably from 0.1 to 3.0 percent by weight of resin solids. Plasticizers are optional ingredients because they promote flow. Examples are high boiling water immiscible materials such as polyalkylene polyols, such as polypropylene polyols or ethylene or propylene oxide adducts of nonyl phenols or bisphenol A. Plasticizers can be used and if so are usually used at levels of about 0 to 15 percent by weight resin solids.

In a most preferred embodiment, the aqueous dispersions of the invention will be electrodepositable and will be used to prepare electrodepositable primers. In general, the aqueous dispersion will be combined with pigment pastes and additional water to form electrodepositable primers. Such electrodepositable primers may also be described as electrocoat baths. An article to be coated is immersed into a large volume of electrodepositable primer called a bath.

The electrodepositable primers of the invention will generally have from 1.00–20.00% by weight of the acrylic polymer (a), preferably from 5.00 to 15.00%, and most preferably from 8.00 to 14.00% by weight of acrylic polymer (a), based on the total weight of the electrodepositable primer.

The electrodepositable primers of the invention will generally have from 0.50–15.00% by weight of the crosslinking agent (b), preferably from 1.00 to 10.00%, and most preferably from 2.00 to 8.00% by weight of crosslinking agent (b), based on the total weight of the electrodepositable primer.

The electrodepositable primers of the invention will generally have from 40–98% by weight of water, preferably from 60–95%, and most preferably from 70–90% by weight of water, based on the total weight of the electrodepositable primer.

The bath will generally contain conventional pigments such as titanium dioxide, ferric oxide, carbon black, aluminum silicate, precipitated barium sulfate, and aluminum phosphomolybdate. For most electrodeposition primers, the pigment-to-resin weight ratio will generally be less than 50:100, more preferably less than 40:100, and usually about 10 to 30:100. In a most preferred embodiment, electrodeposition primer will have a pigment to binder ratio of less than 30:100, preferably less than 20:100, and most preferably from 1:100 to 10:100.

In a most preferred embodiment, the electrodepositable primers of the invention will be free of lead, especially lead containing pigments.

Such electrodepositable primers and baths may further comprise catalysts, dispersing agents, surfactants, additives and the like as are indicated above with respect to the aqueous dispersion. It will be appreciated that such catalysts and/or additives may be incorporated directly into the dispersion, bath, pigment paste or a combination thereof.

Both the electrodepositable bath and the electrodepositable aqueous dispersions used therein will have an electroconductivity of from 0.1 to 5 mS/cm, preferably from 0.5 to 3 mS/cm. When this value is too low, it is difficult to obtain a film thickness having desired protective and other functions. Conversely, if the aqueous dispersion or electrodepositable primer or bath is too conductive, problems such as the dissolution of substrate or counter electrode in the bath, uneven film thickness or poor water or corrosion resistance may arise.

The aqueous dispersions of the invention may also be utilized in the form of nonelectrodepositable coatings such as topcoats, basecoats, primers, and the like. Such coatings may be applied using air atomization, dipping and the like. Thus, the aqueous dispersion of the invention maybe substantially free of pigments so as to be a transparent clearcoat or may contain one or more effect pigments.

The electrodeposition primers of the invention will be electrodeposited on a conductive substrate by the electrodeposition coating process at a nonvolatile content of 10 to 25% by weight to a dry film thickness of 15 to 35 microns. The use of the aqueous dispersions of the invention provides electrodepositable primers having particularly advantageous volatile organic contents or VOCs. VOC may be calculated by known methods. The VOCs of the electrodepositable primers of the invention are generally between 0.1 to 3.0, particularly less than 3.0, preferably less than 2.0, more preferably less than 1.0 and most preferably between 0.1 and 0.9.

Electrodeposition of the coating preparations according to the invention may be carried out by any of a number of processes known to those skilled in the art. The deposition may be carried out on all electrically conducting substrates, for example metal, such as steel, copper, aluminum and the like.

After an article is coated with the electrodeposition primers of the invention, the composition is subjected to conditions so as to cure the coating layers. Although various methods of curing may be used, including curing at ambient conditions, heat-curing is preferred because it has added benefits, such as driving off residual water or solvent from the coating composition. Generally, heat curing is effected by exposing the coated article to elevated temperatures provided primarily by radiative heat sources. Curing temperatures will vary depending on the particular blocking groups used in the cross-linking agents, however they generally range between 135–230° C./275–450° F., preferably between 140–200° C./ 285–393° F., and most preferably between 165–190° C./330–375° F. The curing will vary depending on the particular components used, and physical parameters such as the thickness of the layers, however, typical curing times range from 15 to 60 minutes.

The use of the electrodepositable primers of the invention unexpectedly provides advantageous finished film properties as well as desirable VOCs. The electrodepositable primers of the invention provide improved durability while still maintaining acceptable levels of corrosion resistance. It is possible to obtain glossy films having a minimum 60° gloss of at least 60, more preferably at least 70, and most preferably at least 75.

Finished films made with the electrodepositable primers of the invention will have a corrosion resistance of no more than 3 mm scribe creep as tested per GM9511 and evaluated per GM9102. Durability of the finished electrocoat films may be measured by weatherometer (WOM) and QUV. Weatherometer determinations are tested and evaluated per SAEJ1960. Finished electrocoat films of the invention will have retain at least 80% of their original gloss after 400 hours WOM testing, more preferably at least 90%, and most preferably 98 to 100% of their original gloss, based on a 60° glossmeter. Finished electrocoat film of the invention will further retain at least 80% of their original gloss after 100 hours QUV, preferably at least 90%, and most preferably 98 to 100% of their original gloss, based on a 60° glossmeter and per SAEJ2020.

The invention is further described in the following examples.

EXAMPLE 1

Preparation of Cathodic Aqueous Dispersion According to the Invention

Part (i)

Preparation of Mixture (i) Having an Acrylic Polymer Comprising Precursor Saltable Groups To a 5 liter round bottom 4-neck flask set up with a monomer addition pump, condenser, temperature probe, nitrogen feed line and mixing shaft was added 239.8 grams of toluene. Concurrently, 950 grams of a monomer mixture of an epoxy functional ethylenically unsaturated monomer, a hydroxy functional ethylenically unsaturated monomer, alkyl esters of methacrylic acid and acrylic acid, and an aromatic vinyl monomer were mixed in a separate vessel with 59.47 grams of toluene and 43.59 grams of 2,2'-Azobis (2-methylbutyronitrile) (VAZO®67) until a clear solution was obtained.

After heating the toluene to reflux (108°–112° C.) under nitrogen, the aforementioned clear solution was added to the reaction vessel over a period of 3 hours via the monomer addition pump. During this addition, a reaction temperature of (108°–113° C.) was maintained. Following the completion of the addition, 32.3 grams of toluene were flushed through the monomer addition pump in to the reaction flask. Immediately following this addition, a solution of 12.01 grams of toluene and 9.17 grams of 2,2'-Azobis(2-methylbutyronitrile) (VAZO®67). This solution was added to the reaction flask over 20 minutes, while maintaining a temperature of 111°–115° C.

Following this addition, 11.1 grams of toluene were flushed through the monomer addition pump and into the reaction flask, and the batch temperature was maintained at 111°–115° C. for 90 minutes. Concurrently, a solution of 8.45 grams of methyl isobutyl ketone (MIBK) and 1.25 grams of an organic antioxident (Irganox®245) was made. After a 90 minute holding period, this solution was added to the reaction flask. In addition, 49.3 grams of a glycol ether blocked isocyanaurate based reactive diluent (89% NV in MIBK) was added to the reaction flask. The resulting mixture (i) was then cooled to 105°–110° C. for a % NV of 71.28, based on the total weight of mixture (i). The resulting acrylic resin had an epoxy content of 0.675 mEQ epoxy/g NV.

Part (ii)

Preparation of Mixture (i) Having a % NV of at Least 40.0% NV

A distillation and collection apparatus was installed onto the reaction vessel. Vacuum was applied to the vessel while maintaining a batch temperature of 100°–110° C. Solvent was condensed in the distillation apparatus and collected in a series of three collection vessels (traps). Distillation was continued until 15 minutes after no condensation was visible in the distillation apparatus (approximately 40 minutes total time). The resulting stripped mixture (i) had a % NV of between 95–98%, based on the total weight of mixture (i).

Part (iii)

Addition of Conversion Compound to Mixture (i) and Melt Mixing of Crosslinking Agent (b)

Following the vacuum distillation process, 54.0 grams of propylene glycol phenyl ether (Dowanol® PPh) and 30.0 grams of propylene glycol propyl ether (Dowanol® PnP) were added to the reaction flask of mixture (i) above to reduce the viscosity and cool the batch to 85°–90° C. 47.41 grams of methylethanolamine, 7.36 grams of an acetylenic alcohol surfactant, 9.28 of an anticratering agent and 30.0 grams of Dowanol® PPh (coalescing solvent) were then added to the reaction flask.

The reaction was exothermic and the temperature was maintained at 90°–95° C. for 2 hours. Following this holding period, 32.0 grams of a polymeric surfactant was added to the reaction flask, followed by a slow addition of 480.0 grams of Vestagon® B1065 solid crosslinker pellets. The batch was mixed for 20–30 minutes while maintaining a temperature of 95°–105° C., until no pieces of the solid crosslinker were visible in the resulting melt-mixture (ii). The hydroxyl content of acrylic polymer (a) was 3.06 mEQ OH/gram NV of acrylic polymer (a). The amine (saltable site) content of acrylic polymer (a) was 0.63 mEQ amine/ gram NV of acrylic polymer (a).

Part (iv)

Preparation of Salted Melt-Mixture (iii) and the Aqueous Dispersion of the Invention The above melt-mixture (ii) was cooled to 98° C. and 38.71 grams of lactic Acid (88%) and 40.0 grams of deionized water added. After mixing the resulting salted melt-mixture (iii) for 15 minutes and cooling to 85° C., the following ingredients were added: 4.64 grams of dibutyltindilaurate and 7.67 grams of Dowanol® PnP.

After mixing the batch for 10 minutes, 2060 grams of deionized water were slowly added to emulsify the salted melt-mixture (iii). Following the emulsification, 66.1 grams of a rheology control additive was added to the batch, as well as another 43 grams of deionized water. The final emulsion had nonvolatile content of 40.2%, a pH of 5.60, and a conductivity of 1420 micromhos.

EXAMPLE 2

Preparation of a Cathodic Electrodepositable Primer (Bath) Using the Aqueous Dispersion of the Invention.

Part (i)

Preparation of a Black Pigment Paste

To a tank were added the following materials in order, 447 parts of deionized water, 352 parts of a epoxy resin solution prepared in accordance with of U.S. Pat. No. 5,324,404, and 6 parts glacial acetic acid. The materials were mixed for a minimum of ten minutes and the following added under low agitation: 32 parts of a dispersing agent, 82 parts of a mixture of high and low grade carbon blacks, and 42 parts of dibutyl tin oxide. The mixing speed was increased to high and was maintained for a minimum of 45 minutes. Deionized water was added to obtain a viscosity of 75–85 KU. The paste was then mixed at high speeds for 3 hours in the presence of ceramic grinding media to obtain a fineness of grind of 11 microns. The final pigment paste had a % NV between 36–40 and a pigment to binder ratio of between 0.50–0.70 and was free of heavy metals such as lead and chrome.

Part (ii)

Preparation of a Cathodic Electrodepositable Primer (Electrocoat Bath) of the Invention To a gallon vessel were added 1634 grams of the aqueous dispersion of Example 1 above and 2195 grams of deionized water. After mixing for 5 minutes, 171 grams of the black pigment paste from Example 2, part (i) above were added. The bath had a pigment/binder ratio of 0.03 and a solids content of 18%. After mixing for 2 hours in an open vessel, the bath had a pH of approximately 5–6 and a conductivity between 1200–2000 micromhos.

EXAMPLE 3

Deposition of Cathodic Electrodepositable Primer According to the Invention

Using a DC rectifier 4"×12" zinc phosphated and organic sealed cold rolled steel panels (commercially available from ACT Laboratories of Hillsdale, Mich.) were coated via cathodic electrodeposition in the cathodic electrocoat bath of Example 2. The set voltage was between 175 and 250 volts. The amps were set at 0.8 to 1.0 amps and the deposition time was 2.2 to 2.5 minutes. The bath temperature was 90° F.

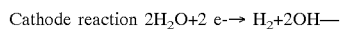
Cathode reaction $2H_2O + 2\ e\text{-} \rightarrow H_2 + 2OH-$

The panels were baked for 20 minutes (metal temperature) at 350° F. to obtain 0.8 to 1.0 mils dry film build. The resulting test panels were submitted to cyclic corrosion and weatherometer testing beside similarly prepared test panels of a lead containing competitive product, Powercron®830 from PPG Industies. The results and test parameters are indicated below.

| Corrosion Test[1] | |
|---|---|
| Electrodepositable primer of the invention | <3 mm scribe creep |
| Comparative electrodepositable primer | <3 mm scribe creep |
| 336 Hour Salt Spray Test[2] | |
| Electrodepositable primer of the invention | <2.5 mm scribe creep |
| Comparative electrodepositable primer | <2.5 mm scribe creep |

400 Hour Weatherometer Test[3]

60° Gloss Measurements

| | Initial | after 400 Hours |
|---|---|---|
| Electrodepositable primer of the invention | 81 | 71–73 |
| Comparative electrodepositable primer | 67 | 6–8 |

100 Hour QUV Test[4]

| | % 60° gloss retention after 100 Hours |
|---|---|
| Electrodepositable primer of the invention | 99% |
| Comparative electrodepositable primer | 86% |

[1]The test panels were prepared and tested per GM9511 and evaluated per GM 9102.
[2]The test panels were prepared, tested and evaluated per ASTM B117-97 336 hour salt spray
[3]The test panels were prepared, tested and evaluated per SAE J1960.
[4]The test panels were prepared, tested and evaluated per SAEJ2020.

The results show that equivalent corrosion performance is obtained with both the electrodepositable primer of the invention and the comparative electrodepositable primer. However, the electrodepositable primer of the invention has significantly better durability as indicated by the 400 Hour Weatherometer and QUV test results.

We claim:

1. A method of making an aqueous dispersion, comprising providing a polymer (a) comprising at least one water dispersible group per molecule and one or more functional groups (f) reactive with crosslinking agent (b), providing at least one crosslinking agent (b) comprising one or more blocked functional groups ($f_b$) that are reactive with polymer (a) after unblocking, wherein crosslinking agent (b) has a $T_g$ of from 40 to 70° C./105 to 158° F. and is a solid at 23.9° C./75° F. when at 100% by weight solids, mixing crosslinking agent (b) into polymer (a) at a temperature that is at or above the melting temperatures of both polymer (a) and compound (b) but which is below the temperature at which blocked functional groups ($f_b$) unblock, so as to provide a melt-mixture (ii), and adding a sufficient amount of water to the melt-mixture (iii) so as to provide an aqueous dispersion.

2. The method of claim 1 wherein the at least one water dispersible group is a nonionic group.

3. The method of claim 1 wherein the at least one water dispersible group is a saltable group or a precursor saltable group.

4. The method of claim 3 further comprising adding at least one salting agent into the melt-mixture (ii) so as to form one or more salted sites per molecule of polymer (a) to create a salted melt-mixture (iii) wherein the sufficient amount of water is added to the salted melt-mixture (iii) so as to provide an aqueous dispersion.

5. The method of claim 4 wherein the aqueous dispersion is electrodepositable.

6. The method of claim 1 wherein polymer (a) comprises a polymer selected from the group consisting of polyurethane polymers, acrylic polymers, epoxy based polymers and mixtures thereof.

7. The method of claim 3 wherein polymer (a) is an acrylic polymer.

8. The method of claim 7 wherein the aqueous dispersion has no more than 5% by weight nonvolatile of an epoxy functional polymer, based on the total nonvolatile weight of polymer (a) and crosslinking agent (b).

9. The method of claim 7 wherein providing polymer (a) comprises providing a mixture (i) comprising polymer (a) and one or more polymerization solvents, said mixture (i) having a solids content of at least 50% by weight, based on the total weight of mixture (i).

10. The method of claim 9 wherein mixture (i) has a solids content of at least 70.0% by weight, based on the total weight of mixture (i).

11. The method of claim 10 wherein mixture (i) has a solids content of at least 90.0% by weight, based on the total weight of mixture (i).

12. The method of claim 11 wherein mixture (i) has a solids content of at least 99.0% by weight, based on the total weight of mixture (i).

13. The method of claim 9 wherein the aqueous dispersion comprises the one or more polymerization solvents of mixture (i).

14. The method of claim 13 further comprising removing at least a portion of said polymerization solvents from the dispersion to provide a dispersion having less than 5.0% by weight of polymerization solvents, based on the total weight of the aqueous dispersion.

15. The method of claim 14 further comprising removing an amount of said polymerization solvents from the dispersion to provide a dispersion having less than 1.0% by weight of polymerization solvents, based on the total weight of the aqueous dispersion.

16. The method of claim 15 further comprising removing an amount of said polymerization solvents from the dispersion to provide a dispersion having less than 0.5% by weight of polymerization solvents, based on the total weight of the aqueous dispersion.

17. The method of claim 1 wherein the dispersion has an average particle size of from 0.05 to 0.50 microns.

18. The method of claim 1 comprising providing a polymer (a) having a solids content of at least 70.0% by weight nonvolatile based on the total weight of polymer (a).

19. The method of claim 18 wherein polymer (a) has a solids content of at least 80.0% by weight nonvolatile based on the total weight of polymer (a).

20. The method of claim 19 wherein polymer (a) has a solids content of at least 90.0% by weight nonvolatile based on the total weight of polymer (a).

21. The method of claim 20 wherein polymer (a) has a solids content of at least 99.0% by weight nonvolatile based on the total weight of polymer (a).

22. The method of claim 18 wherein the step of providing a polymer (a) of at least 70.0% solids further comprises
  polymerizing one or more polymerizable monomers in one or more polymerization solvents, wherein at least one monomer comprises an saltable group or a precursor saltable group, so as to form a mixture (i) comprising said polymerization solvents and a polymer (a) comprising one or more saltable groups or precursor saltable groups,
  removing at least a portion of said polymerization solvents from the mixture (i) to provide a mixture (i) having a solids content of at least 70% by weight solids, based on the total weight of mixture (i).

23. The method of claim 22 wherein the polymerizable monomers are ethylenically unsaturated monomers and the polymer (a) is an acrylic polymer.

24. The method of claim 3 wherein polymer (a) has from 0.2 to 3.0 mEQ saltable sites/gram NV polymer (a).

25. The method of claim 24 wherein polymer (a) has from 0.4 to 2.0 mEQ saltable sites/gram NV polymer (a).

26. The method of claim 25 wherein polymer (a) has from 0.6 to 0.90 mEQ saltable sites/gram NV polymer (a).

27. The method of claim 4 wherein the step of adding at least one salting agent to the melt-mixture (ii) comprises adding sufficient salting agent so as to salt from 20 to 100% of the saltable sites on polymer (a), based on the total number of saltable sites of polymer (a).

28. The method of claim 27 wherein the step of adding at least one salting agent to the melt-mixture (ii) comprises adding sufficient salting agent so as to salt from 40 to 80% of the saltable sites on polymer (a), based on the total number of saltable sites of polymer (a).

29. The method of claim 28 wherein the step of adding at least one salting agent to the melt-mixture (ii) comprises adding sufficient salting agent so as to salt from 55 to 65% of the saltable sites on polymer (a), based on the total number of saltable sites of polymer (a).

30. The method of claim 4 wherein the salted polymer (a) has from 0.5 to 8.0 mEQ OH/gram NV of polymer (a).

31. The method of claim 30 wherein the salted polymer (a) has from 1.5 to 6.0 mEQ OH/gram NV of polymer (a).

32. The method of claim 31 wherein the salted polymer (a) has from 2.5 to 4.5 mEQ OH/gram NV of polymer (a).

33. The method of claim 7 wherein acrylic polymer (a) has from 0.6 to 0.9 mEQ saltable sites/gram NV acrylic polymer (a), from 2.5 to 4.5 mEQ OH/ grams NV acrylic polymer (a) and from 55 to 65% of the saltable sites are neutralized by the addition of the at least one salting agent.

34. A method of making an aqueous electrodepositable dispersion, comprising
  polymerizing one or more ethylenically unsaturated monomers in one or more polymerization solvents, wherein at least one of the ethylenically unsaturated monomers contains an saltable group Of a precursor saltable group, so as to form a mixture (i) comprising said polymerization solvents and an acrylic polymer (a) comprising one or more saltable groups or precursor saltable groups,
  removing at least a portion of said polymerization solvents from mixture (i) to provide a mixture (i) having a solids content of at least than 50% by weight solids and comprising acrylic polymer (a), based on the total weight of mixture (i),
  providing at least one crosslinking agent (b) comprising one or more blocked functional groups ($f_b$) that are reactive with acrylic polymer (a) after unblocking, wherein crosslinking agent (b) has a $T_g$ of from 40 to 70° C./105 to 158° F. and is a solid at 23.9° C./75° F. when at 100% nonvolatile,
  mixing crosslinking agent (b) into mixture (i) at a temperature which is at or above the melting temperature of both acrylic polymer (a) and crosslinking agent (b) but which is below the temperature at which blocked functional groups ($f_b$) unblock, so as to provide a melt-mixturo (ii),
  adding at least one salting agent into the melt-mixture (ii) so as to form one or more salted sites per molecule of acrylic polymer (a) to create a salted melt-mixture (iii) and
  adding a sufficient amount of water to the salted melt-mixture (iii) so as to provide an aqueous electrodepositable dispersion.

35. The method of claim 34 wherein acrylic polymer (a) comprises one or more precursor saltable sites.

36. The method of claim 35 further comprising reacting the one or more saltable precursor sites with at least one conversion compound to produce one or more saltable sites.

37. The method of claim 34 wherein acrylic polymer (a) comprises one or more cationic saltable sites.

38. The method of claim 34 wherein acrylic polymer (a) comprises one or more cationic precursor saltable sites.

39. The method of claim 38 wherein the one or more cationic precursor saltable sites are epoxy groups.

40. The method of claim 39 wherein the epoxy groups are reacted with an secondary amine group to form a tertiary amine group.

41. The method of claim 37 wherein the step of adding a sufficient amount of a salt forming compound comprises adding a sufficient amount of an acidic compound.

42. The method of claim 34 wherein acrylic polymer (a) comprises one or more anionic salting sites.

43. The method of claim 42 wherein the step of adding a sufficient amount of a salt forming compound comprises adding a sufficient amount of an basic compound.

44. The method of claim 34 wherein the aqueous electrodepositable dispersion has an average particle size of from 0.05 to 0.50 microns.

45. The method of claim 44 wherein the aqueous electrodepositable dispersion has an average particle size of from 0.10 to 0.40 microns.

46. The method of claim 45 wherein the aqueous electrodepositable dispersion has an average particle size of from 0.20 to 0.35 microns.

47. The method of claim 34 comprising removing sufficient polymerization solvent so as to provide a mixture (iii) having at least 70% by weight solids.

48. The method of claim 47 comprising removing sufficient polymerization solvent so as to provide a mixture (iii) having at least 80% by weight solids.

49. The method of claim 34 wherein at least one crosslinking agent (b) comprises at least two or more blocked isocyanate groups.

50. The method of claim 49 wherein the one or more isocyanate groups are blocked with e-caprolactam.

51. The method of claim 34 wherein at least one crosslinking agent (b) has a $T_g$ of from 30 to 90° C./86 to 194° F.

52. The method of claim 51 wherein at least one crosslinking agent (b) has a $T_g$ of from 40 to 70° C./105 to 158° F.

53. The method of claim 34 wherein polymer (a) has from 0.2 to 3.00 mEQ saltable sites/gram NV polymer (a).

54. The method of claim 53 wherein polymer (a) has from 0.4 to 2.00 mEQ saltable sites/gram NV polymer (a).

55. The method of claim 54 wherein polymer (a) has from 0.6 to 0.90 mEQ saltable sites/gram NV polymer (a).

56. The method of claim 34 wherein the step of adding at least one salting agent to the melt-mixture (ii) comprises adding sufficient salting agent so as to salt from 20 to 100% of the saltable sites on polymer (a), based on the total number of saltable sites of polymer (a).

57. The method of claim 56 wherein the step of adding at least one salting agent to the melt-mixture (ii) comprises adding sufficient salting agent so as to salt from 40 to 80% of the saltable sites on polymer (a), based on the total number of saltable silos of polymer (a).

58. The method of claim 57 wherein the step of adding at least one salting agent to the melt-mixture (ii) comprises adding sufficient salting agent so as to salt from 55 to 65% of the saltable sites on polymer (a), based on the total number of saltable sites of polymer (a).

59. The method of claim 34 wherein the salted polymer (a) has from 0.5 to 8.0 mEQ OH/gram NV of polymer (a).

60. The method of claim 59 wherein the salted polymer (a) has from 1.5 to 6.0 mEQ OH/gram NV of polymer (a).

61. The method of claim 60 wherein the salted polymer (a) has from 2.5 to 4.5 mEQ ON/gram NV of polymer (a).

62. The method of claim 34 wherein acrylic polymer (a) has from 0.6 to 0.9 mEQ saltable sites/gram NV acrylic polymer (a), from 2.5 to 4.5 mEQ OH/ grams NV acrylic polymer (a) and from 55 to 65% of the saltable sites are neutralized by the addition of the at least one salting agent.

* * * * *